United States Patent
Ceccaroli

(10) Patent No.: US 10,783,737 B2
(45) Date of Patent: Sep. 22, 2020

(54) AUTOMATIC BEVERAGE DISPENSING MACHINE WITH IMPROVED HUMAN-MACHINE INTERFACE

(71) Applicant: N&W Global Vending S.p.A., Valbrembo (IT)

(72) Inventor: Stefano Ceccaroli, Valbrembo (IT)

(73) Assignee: N&W GLOBAL VENDING S.P.A., Valbrembo (IT)

(*) Notice: Subject to any disclaimer, the term of this patent is extended or adjusted under 35 U.S.C. 154(b) by 508 days.

(21) Appl. No.: 15/569,026

(22) PCT Filed: Apr. 29, 2016

(86) PCT No.: PCT/IB2016/052456
§ 371 (c)(1),
(2) Date: Oct. 24, 2017

(87) PCT Pub. No.: WO2016/174635
PCT Pub. Date: Nov. 3, 2016

(65) Prior Publication Data
US 2018/0130279 A1    May 10, 2018

(30) Foreign Application Priority Data
Apr. 30, 2015 (EP) .................................. 15166090

(51) Int. Cl.
*G07F 13/10* (2006.01)
*G07F 13/06* (2006.01)
*G06F 3/0488* (2013.01)

(52) U.S. Cl.
CPC ............ *G07F 13/10* (2013.01); *G06F 3/0488* (2013.01); *G07F 13/065* (2013.01)

(58) Field of Classification Search
CPC ...... G07F 13/10; G07F 13/065; G06F 3/0488; A47J 31/44; A47J 31/40; A47J 31/52
(Continued)

(56) References Cited

U.S. PATENT DOCUMENTS

| 5,581,670 A * | 12/1996 | Bier | ...................... G06F 3/0481 |
|---|---|---|---|
| | | | 345/629 |
| 6,759,072 B1 * | 7/2004 | Gutwein | .............. G06Q 20/342 |
| | | | 426/433 |

(Continued)

FOREIGN PATENT DOCUMENTS

| EP | 1992263 | 11/2008 |
|---|---|---|
| EP | 2801304 | 11/2014 |

(Continued)

OTHER PUBLICATIONS

International Search Report and Written Opinion from International Application No. PCT/IB2016/052456 dated Sep. 9, 2016.
(Continued)

*Primary Examiner* — Jimmy Chou
(74) *Attorney, Agent, or Firm* — Dorsey & Whitney LLP

(57) ABSTRACT

An automatic beverage dispensing machine (1) provided with: a controller (2); a human-machine interface module—HMI (4), for acquiring the selection made by a user of recipes for the preparation of beverages; and an actuator module (6), to cause the dispensing of a beverage into a receptacle (25), prepared according to a recipe selected via the human-machine interface module (4). The human-machine interface module is provided with: a display unit (10); and a control unit (12), to cause the display of a graphical user interface—GUI (22), and to cause the display, in an area (22c) of the GUI, of a recipe time bar (34) having a number of portions (35), each associated with a respective ingredient and with a respective preparation step of the recipe. The human-machine interface module enables the creation or modification of a recipe by a user through the insertion of a number of ingredients on the recipe time bar, each one in a respective portion, the position of which determines the
(Continued)

temporal positioning of the respective preparation step within the preparation steps of the recipe.

10 Claims, 11 Drawing Sheets

(58) Field of Classification Search
USPC .......... 99/275, 280, 285; 700/233; 426/231, 426/433
See application file for complete search history.

(56) References Cited

U.S. PATENT DOCUMENTS

| | | | | |
|---|---|---|---|---|
| 7,896,038 | B2* | 3/2011 | Jones | A23G 9/22 |
| | | | | 141/103 |
| 8,032,251 | B2 | 10/2011 | Monn | |
| 8,251,258 | B2* | 8/2012 | Rudick | B67D 1/0034 |
| | | | | 222/1 |
| 8,364,321 | B2* | 1/2013 | Kollep | A47J 31/407 |
| | | | | 700/283 |
| 9,218,704 | B2* | 12/2015 | Lim | G06F 3/04842 |
| 9,275,507 | B2* | 3/2016 | Wessels | G05B 15/02 |
| 9,886,185 | B2* | 2/2018 | Abrach | G06F 3/04817 |
| 10,226,148 | B2* | 3/2019 | Roth | B67D 1/0041 |
| 2005/0199646 | A1* | 9/2005 | Moy | B67D 1/0888 |
| | | | | 222/1 |
| 2007/0003062 | A1* | 1/2007 | Mizikovsky | H04W 12/0401 |
| | | | | 380/270 |
| 2007/0205221 | A1* | 9/2007 | Carpenter | B67D 1/0051 |
| | | | | 222/129.4 |
| 2007/0267441 | A1* | 11/2007 | van Opstal | B67D 1/0857 |
| | | | | 222/129.4 |
| 2008/0050480 | A1* | 2/2008 | Doglioni Majer | A47J 31/4482 |
| | | | | 426/231 |
| 2008/0183330 | A1* | 7/2008 | Monn | G07F 9/023 |
| | | | | 700/239 |
| 2009/0014464 | A1* | 1/2009 | Adbelmoteleb | B67D 1/07 |
| | | | | 222/1 |
| 2009/0065520 | A1* | 3/2009 | Peters | B67D 1/0041 |
| | | | | 221/1 |
| 2009/0065570 | A1* | 3/2009 | Peters | G06Q 30/02 |
| | | | | 235/378 |
| 2009/0069930 | A1* | 3/2009 | Peters | G07F 9/002 |
| | | | | 700/236 |
| 2009/0069949 | A1* | 3/2009 | Carpenter | B67D 1/0021 |
| | | | | 700/283 |
| 2009/0070234 | A1* | 3/2009 | Peters | G07F 9/002 |
| | | | | 705/26.1 |
| 2009/0084269 | A1* | 4/2009 | Pozzari | A47J 31/4407 |
| | | | | 99/275 |
| 2010/0139493 | A1* | 6/2010 | Nevarez | A47J 31/002 |
| | | | | 99/275 |
| 2011/0123688 | A1* | 5/2011 | Deo | B67D 1/0034 |
| | | | | 426/231 |
| 2012/0156337 | A1* | 6/2012 | Studor | A47J 31/5253 |
| | | | | 426/231 |
| 2012/0158173 | A1* | 6/2012 | Metropulos | G07F 13/065 |
| | | | | 700/236 |
| 2012/0258216 | A1* | 10/2012 | Wessels | G07F 9/02 |
| | | | | 426/231 |
| 2013/0067375 | A1* | 3/2013 | Kim | G05F 1/66 |
| | | | | 715/769 |
| 2013/0087050 | A1* | 4/2013 | Studor | A47J 31/52 |
| | | | | 99/285 |
| 2014/0272025 | A1* | 9/2014 | Wheeler | A47J 31/5253 |
| | | | | 426/231 |
| 2015/0046877 | A1* | 2/2015 | Cuppari | G06Q 30/322 |
| | | | | 715/834 |
| 2015/0082243 | A1* | 3/2015 | Taylor | G07F 9/002 |
| | | | | 715/814 |
| 2015/0158608 | A1* | 6/2015 | Talarico | G07F 13/10 |
| | | | | 53/440 |
| 2015/0166322 | A1* | 6/2015 | O'Sullivan | A23G 9/045 |
| | | | | 221/96 |
| 2015/0355810 | A1* | 12/2015 | Abrach | G06F 3/0482 |
| | | | | 222/1 |
| 2016/0242434 | A1* | 8/2016 | Jones | A23G 9/228 |
| 2017/0039797 | A1* | 2/2017 | Elmery | G07F 13/10 |
| 2017/0293983 | A1* | 10/2017 | Long, II | G06Q 20/18 |
| 2017/0325482 | A1* | 11/2017 | Deng | G07F 13/10 |
| 2019/0330042 | A1* | 10/2019 | Enssle | G07F 13/04 |

FOREIGN PATENT DOCUMENTS

| | | |
|---|---|---|
| RU | 2398283 C2 | 8/2010 |
| SU | 258754 A1 | 4/1970 |
| WO | 2011046428 A1 | 4/2011 |

OTHER PUBLICATIONS

Second Written Opinion from International Application No. PCT/IB2016/052456 dated May 11, 2017.
International Preliminary Report on Patentability from International Application No. PCT/IB2016/052456 completed Sep. 15, 2017.
Demand under Article 31 for International Application No. PCT/IB2016/052456.

* cited by examiner

US 10,783,737 B2

AUTOMATIC BEVERAGE DISPENSING MACHINE WITH IMPROVED HUMAN-MACHINE INTERFACE

TECHNICAL FIELD OF INVENTION

The present invention relates to an automatic beverage dispensing machine having an improved human-machine interface (HMI), in particular allowing a user increased personalization in the services offered.

The present invention finds advantageous application in automatic dispensing machines of so-called instantaneous hot or cold beverages, i.e. prepared upon demand starting from liquid and/or powdered ingredients, based on recipes.

As will be discussed in detail hereinafter, the human-machine interface according to the present invention offers the possibility of editing the recipes with which the beverages are prepared, allowing the user to personalize the preparation and composition of the beverages, i.e. the ingredients to use and the steps of preparation; the edited recipes are then implemented by the automatic dispensing machine for the consequent preparation and dispensing of beverages, based on these edited recipes.

STATE OF THE ART

A need is surely felt in the field of automatic beverage dispensing machines for developing and adopting technologies that increase interactivity between the user and the automatic dispensing machine and the possibilities of personalization offered to the user.

In particular, there is a demand for the HMI of automatic dispensing machines to offer users increasingly sophisticated interaction possibilities.

In addition, it is known that consumers pay ever increasing attention to the quality and composition of a product, and have ever greater expectations regarding the extent of the choices offered.

However, until now, the possibilities of interaction are generally limited to the simple selection from predetermined preparations and products provided for by each automatic dispensing machine, which are then prepared and dispensed to the users.

OBJECT AND SUMMARY OF THE INVENTION

The object of the present invention is to provide an automatic beverage dispensing machine, in particular for instantaneous beverages, of an improved type, in particular with regard to the associated human-machine interface, which allows satisfying the above-indicated need.

In particular, according to the present invention, an automatic beverage dispensing machine and an associated operating method are provided, as claimed in the appended claims.

DETAILED DESCRIPTION OF PREFERRED EMBODIMENTS OF THE INVENTION

The present invention will now be described in detail with reference to the accompanying drawings to enable an expert in the field to implement it and use it. Various modifications to the described embodiments will be immediately obvious to experts and the generic principles described herein could be applied to other embodiments and applications without departing from the scope of the present invention, as defined in the appended claims. Therefore, the present invention should not be considered as limited to the embodiments set forth herein, but is to be accorded the widest scope consistent with the principles and features disclosed and claimed herein.

Figure 1:
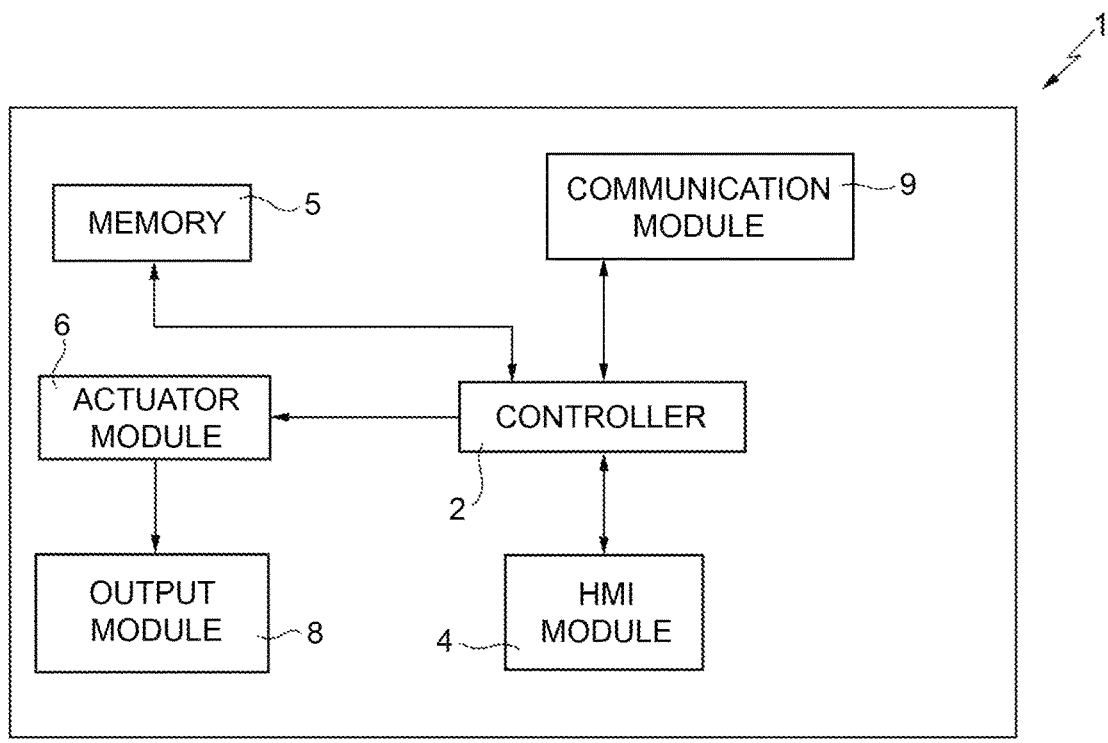
FIG. 1 is a general block diagram concerning an automatic beverage dispensing machine.

FIG. 1 shows the general block diagram of an automatic beverage dispensing machine 1, in particular one for instantaneous beverages, such as coffee, tea, hot chocolate or similar, juices, fruit shakes or vegetable concentrates, which are prepared on demand starting from liquid, solid and/or powdered ingredients.

The automatic beverage dispensing machine 1 comprises:
an electronic controller 2, for example including a microprocessor, a microcontroller, a PLC (Programmable Logic Controller), or a similar digital processing unit, designed to supervise the general operation of the automatic beverage dispensing machine 1, and in particular the preparation of beverages;
a human-machine interface module, HMI, 4, which will be described in detail below, designed to implement an interface between a user (or consumer) and the automatic beverage dispensing machine 1, operatively connected to the controller 2, in particular to allow the user to select a desired product and, as described in detail below, to create or edit the recipe for the product in a personalized manner;
a memory 5, of the non-volatile type, for example RAM (Random Access Memory), operatively connected to the controller 2;
an actuator module 6, which can be operated by the controller 2 to cause the desired product to be supplied to the consumer, for example to cause the preparation of a beverage, based on the selected recipe, created or edited by the user;
an output module 8, operatively connected to the actuator module 6 for the final dispensing of the product to the user; and
a communication module 9, operatively connected to the controller 2 and designed to implement data communications with at least one remote server, provided with a database, over a computer communications network of a local (LAN—Local Area Network) or geographic (WAN—Wide Area Network) type, in particular the Internet, via a wired (for example, DSL or optical fibre) or wireless (for example, satellite or mobile phone) link.

Figure 2:
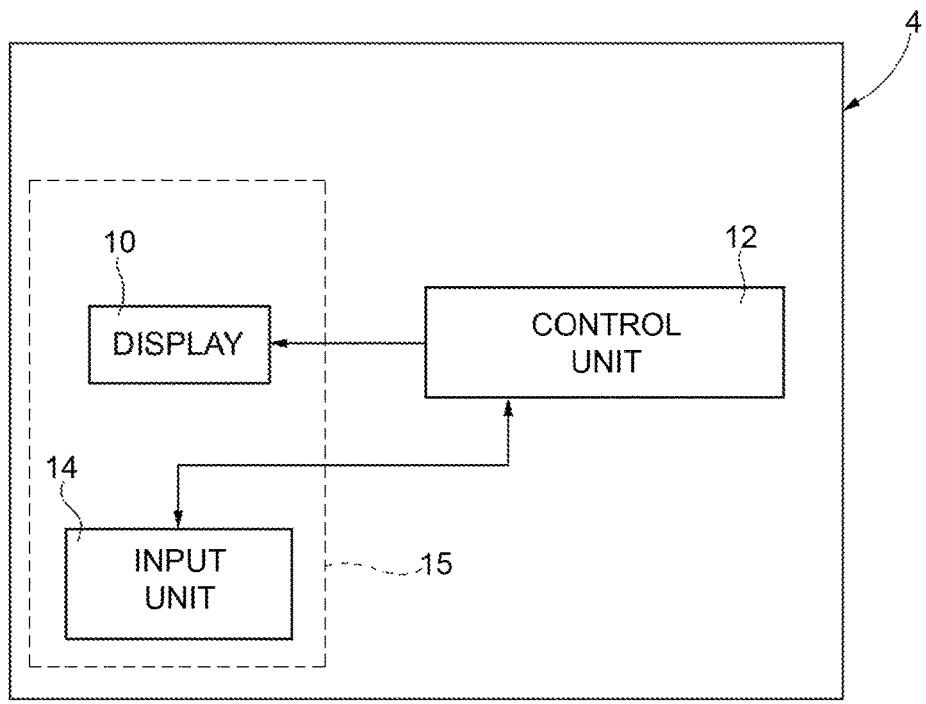
FIG. 2 is a general block diagram of a human-machine interface module in the automatic beverage dispensing machine in FIG. 1.

As shown in greater detail in FIG. 2, the HMI module 4 comprises:

an electronic display unit 10;

an electronic display control unit 12, for example one including a microprocessor, a microcontroller, or a FPGA (Field Programmable Array), connected to the display unit 10 to generate and manage the display of a graphical user interface (GUI); and an input unit 14, connected to the display control unit 12 and designed to receive commands, selections and inputs from a user of the automatic beverage dispensing machine 1.

According to one aspect of this invention, the display unit 10 and the input unit 14 are expediently integrated in a single touch screen 15, designed to display the graphical user interface, in this case configured to display a plurality of touch-controlled selection and data input areas. The touch screen 15 can be made using any known technology, for example, using a capacitive, resistive or optical working principle.

In one possible embodiment, the controller 2 of the automatic beverage dispensing machine 1 may include the display control unit 12, thus being configured to manage the above-mentioned display of the graphical user interface via the display unit 10, in addition to managing the general operation of the automatic beverage dispensing machine 1.

Figure 3:
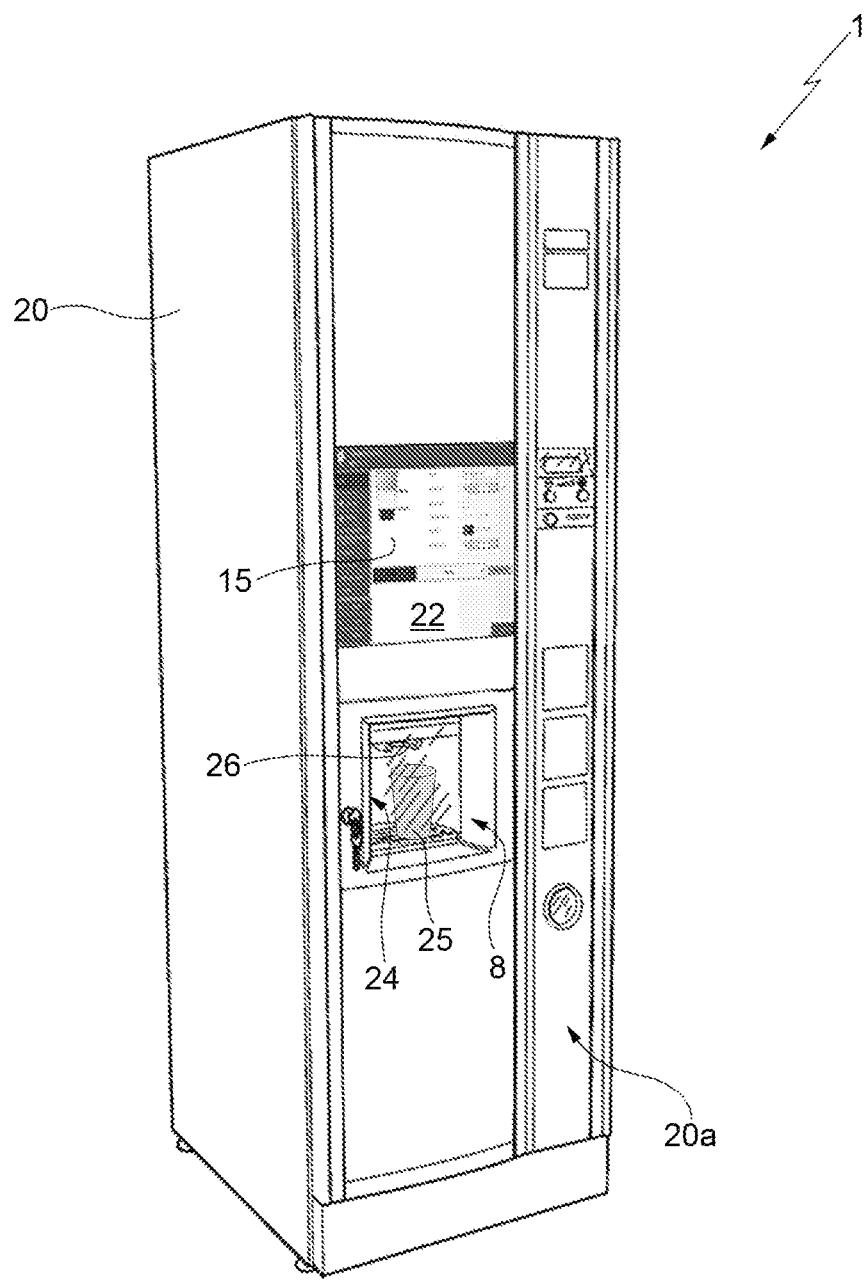
FIG. 3 schematically shows the automatic beverage dispensing machine in FIG. 1.

As schematically shown in FIG. 3, the automatic beverage dispensing machine 1 comprises a casing 20, which houses (in a known manner and not described in detail herein) the actuator module 6, with suitable electromechanical actuators for the preparation of the beverages, as well as the substances and ingredients for that preparation, and also the controller 2, the HMI module 4, the memory 5 and the communication module 9.

A front portion 20a (designed to face the user) of the casing 20 carries the above-mentioned display unit 10 of the HMI module 4, in this case integrated with the input unit 14 in the single touch screen 15, displaying the graphical user interface, indicated here by reference numeral 22; and also the above-mentioned output module 8, which has an opening 24 designed to house one or more receptacles 25 during the dispensing of the prepared product through one or more nozzles 26.

In the embodiment shown in FIG. 3, the automatic beverage dispensing machine 1 is of the free-standing type; nevertheless, similar considerations hold for different types of automatic beverage dispensing machines, for example those of the so-called table-top type.

The operation of the HMI module 4 of the automatic beverage dispensing machine 1 will now be described in detail, which more specifically allows the user to create or edit the recipes for preparing the beverages dispensed by the automatic beverage dispensing machine 1 in a personalized manner.

As mentioned, the display control unit 12 is configured (i.e. is opportunely programmed by means of computer instructions stored in an associated memory, for example the above-mentioned memory 5) to control the display of the graphical user interface (hereinafter GUI) 22 on the touch screen 15.

Figure 4:
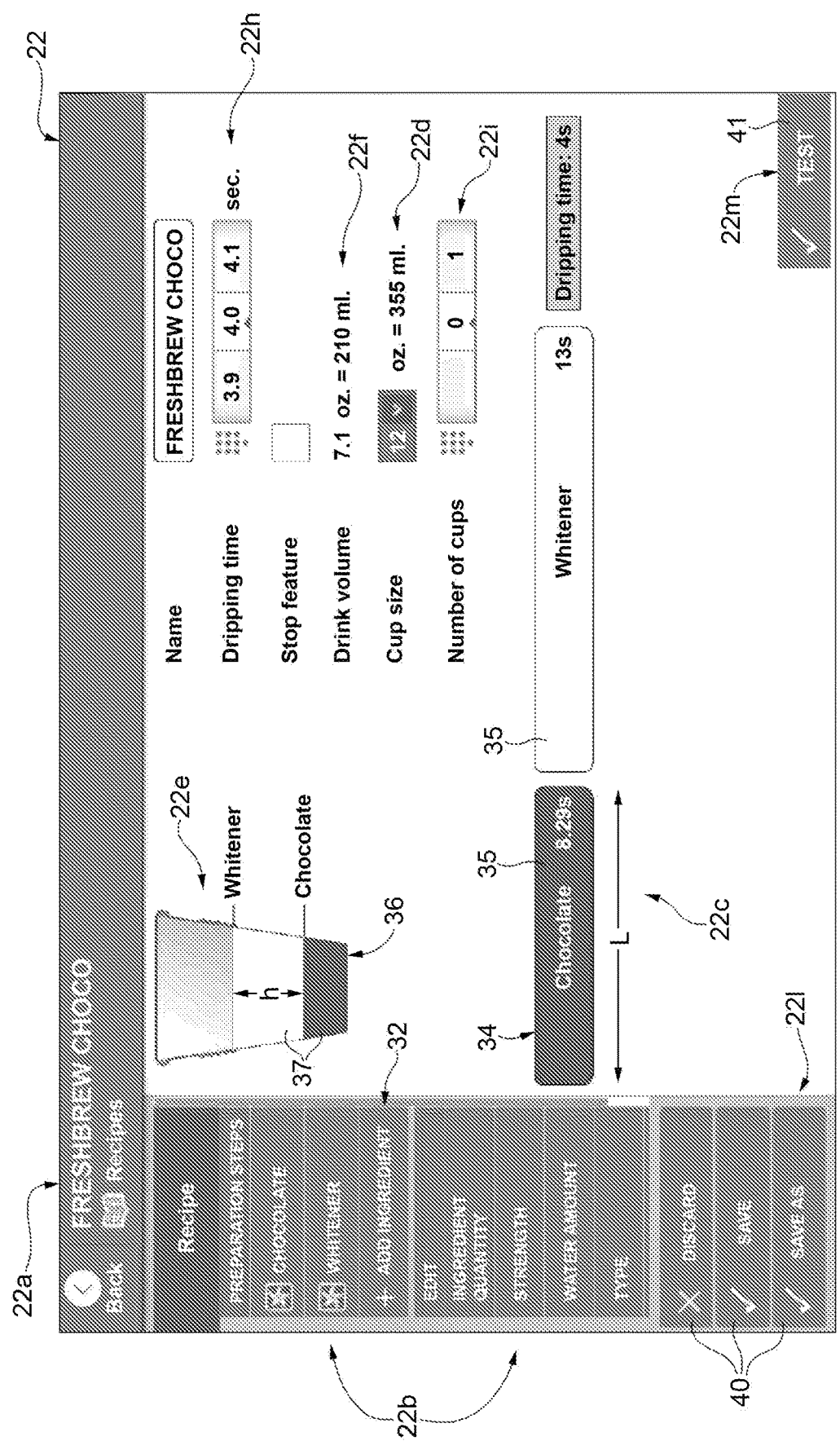
FIG. 4 shows a graphical user interface implemented by the human-machine interface module.

As shown in FIG. 4, the GUI 22 defines a first interface area 22a, for displaying a recipe selection tool for the user.

For example, a list of predefined or previously processed recipes (for example, for the preparation of chocolate, coffee, vegetable concentrates or fruit juices) stored in the memory 5 (or retrieved via connection to a remote server, for example, via Internet) may be displayed in this first interface area 22a; this list may be called up via a drop-down menu, which allows the user to select, by touch, a recipe from the list for subsequent editing or processing, or to create a new recipe, which can be given a name by the user ("Freshbrew choco" in the example shown).

The display control unit 12 is configured to detect the user's selection (by touch) of the selected recipe, and to consequently control the display, in a second interface area 22b of the GUI 22, of a corresponding list of ingredients, for example chocolate, milk substitute (known as whitener), or preparation steps, provided for this selected recipe. In the case of creating a new recipe, this second interface area 22b is initially empty.

An add-ingredients button 32 can also be displayed in the above-mentioned second interface area 22b; when selected by user touching it, this add-ingredients button 32 allows adding one or more preparations or ingredients to the selected recipe. For example, due to the user selecting (touching) the add ingredients button 32, the display control unit 12 can be configured to display a drop-down menu in the second interface area 22b that allows the user to select, by touch, one or more ingredients, these also, for example, stored in the memory 5 (or retrievable via remote connection).

In the second interface area 22b, the display control unit 12 also controls the display of a plurality of user-editable characteristics related to each preparation step, including: dose, or quantity, of the related ingredient; "strength" of the ingredient (for example, selectable from strong, medium-strong or weak in the case of coffee); amount of water for the preparation of the corresponding solution; type of ingredient (in the case of ingredients selectable from different types).

According to one particular aspect of the present invention, the display control unit 12 controls the display, in a third interface area 22c of the GUI 22, of a timeline (or time bar) 34 of the ingredients or preparation steps envisaged by the selected recipe. In this case as well, if the recipe is a new recipe, this third interface area 22c is initially empty.

The above-mentioned time bar 34 comprises a plurality of portions 35, side by side and consecutive along the timeline, each one corresponding to a respective ingredient envisaged by the recipe.

According to one particular aspect of the present invention, each of the portions 35 has a main extension (width) L, which represents the duration of the associated preparation step of the recipe, for example, based on the dose selected for the respective ingredient; the effective duration (together with the name of the associated ingredient) is displayed inside each of the portions 35.

As explained below, the duration of each preparation step and the amount of product dispensed, can be edited directly by the user, or indirectly according to the doses selected for the ingredients.

For example, in the representation in FIG. 4, the time bar 34 comprises a first portion 35 for the "chocolate" ingredient, with a duration of "8.29 s", and a second portion 35, adjacent on the time bar 34 and temporally following the first portion 35, for the "whitener" ingredient, with a duration of "13 s".

The display control unit 12 controls the display, in a fourth interface area 22d of the GUI 22, of a suitable tool for selecting the capacity (for example, the internal volume) of the receptacle 25 for the preparation of the recipe; for example, the display control unit 12 controls the display, in the fourth interface area 22d, of a further drop-down menu, which allows the user to select, by touch, a capacity (internal volume) from a list of available sizes, these also stored in the memory 5, for example "small", "medium" or "large".

Alternatively, the user may select the required volume directly; in the example shown in FIG. 4 the selected capacity is 355 ml.

According to a further particular aspect of the present invention, the display control unit 12 also controls the display, in a fifth interface area 22e of the GUI 22, of a schematic representation 36 of the receptacle 25, the displayed size of which (for example in terms of relative width and height in the two-dimensional representation on the touch screen 15) is representative of, for example proportional to, the capacity selected by the user.

Furthermore, the internal volume of this schematic representation 36 is subdivided into filling areas 37, the number of which is equal to the number of ingredients selected; the size of each filling area 37 (in particular an associated height h) is indicative of the quantity of the respective ingredient and proportional to the duration of the preparation step associated therewith. In particular, the display control unit 12 controls the display of the identifying name of the respective ingredient at each filling area.

Furthermore, the arrangement of the filling areas 37 is based on the arrangement of the corresponding ingredients in the time bar 35, i.e. the filling area 37 associated with the first ingredient to which the first portion 35 of the time bar 34 corresponds is placed at the bottom of the schematic representation 36 of the receptacle 25 (in a lower portion thereof); the filling area 37 associated with the second ingredient to which second portion 35 of the time bar 34 corresponds is placed above the first filling area 37 in the schematic representation 36 of the receptacle 25, and so on (in the example shown in FIG. 4, only two filling areas 37 are present, as there only two ingredients in the selected recipe).

In particular, the display control unit 12 implements a suitable algorithm to calculate, for each ingredient (or its solution, for example an aqueous solution, used in the preparation), the volume occupied inside the receptacle 25 (and the size of the associated filling area 37 in the schematic representation 36), based on the duration of the respective preparation step (and, as will be obvious to an expert in the field, based on the characteristics of the actuator module 6 and the output module 8, which define the circuit for feeding the ingredient, or its solution, into the receptacle 25).

As a further indication for the user, the display control unit 12 controls the display, in a sixth interface area 22f of the GUI 22, of an indication of the total volume filling the receptacle 25, calculated in real time and based on the ingredients and the duration of the selected preparations (the sum of the respective sizes of the filling areas 37 is thus indicative of this total volume).

The display control unit 12 also controls the display:
in a seventh interface area 22h of the GUI 22, of a tool for selecting the duration of a "dripping" step, known as the dripping time, after the preparation of the beverage (i.e., in a known manner, of the time interval that is devoted to emptying tubes inside the automatic beverage dispensing machine 1), and also of a so-called "stop feature"; and
in an eighth interface area 22i of the GUI 22, of a tool for selecting a number of consecutive preparations that must be made starting from the same selected recipe.

According to one particular aspect of the present invention, the display control unit 12 is capable of detecting a plurality of touch operations by the user on the touch screen 15, aimed at the creation or modification (in general, the so-called editing) of the recipe for the preparation of the selected beverage.

These touch operations can be performed, in a manner obvious to an expert in the field, by the touch of one or more of the user's fingers, or of a touch tool, such as a digital stylus or similar, on one or more areas of the touch screen 15; multiple touch operations, in sequence or simultaneously, can also be performed.

In detail, the display control unit 12 detects an operation of selection of an ingredient in the list of ingredients displayed in the second interface area 22b and of insertion of the same ingredient in the time bar 34.

Figure 5A:
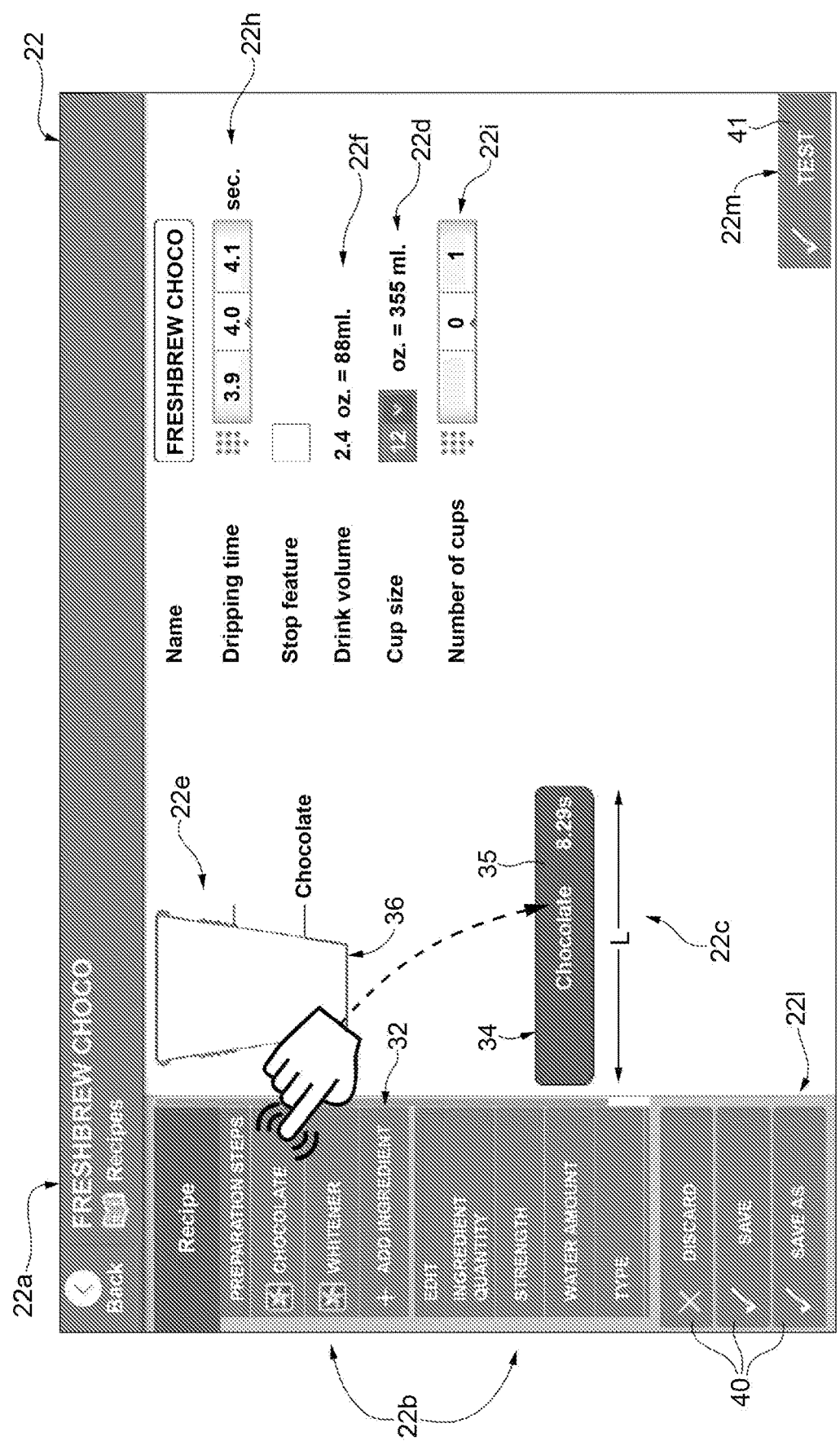
FIGS. 5*a*-5*b* show the graphical user interface with reference to a first user operation.

In particular, this insertion takes place via a drag and drop operation (known as "drag&drop") of the ingredient onto time bar 34 displayed in the third interface area 22c of the GUI 22, as schematically shown in FIG. 5a, which refers to the insertion of a first ingredient for the creation of a new recipe.

In particular, this operation enables inserting a further preparation step in the consecutive sequence represented by the time bar 34.

Figure 5B:
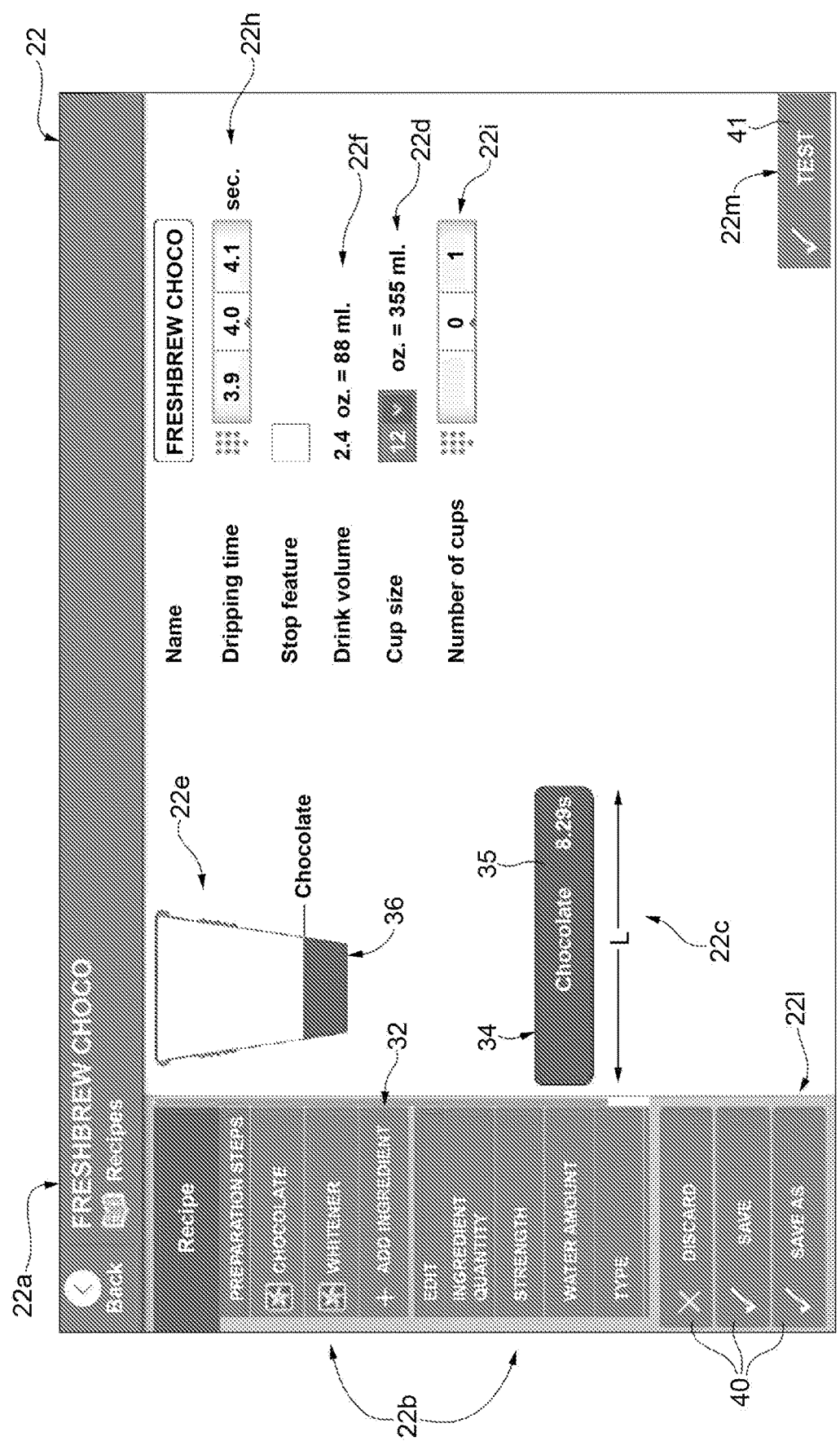

The display control unit 12 updates the display of the time bar 34 according to the drop position of the ingredient on the time bar 34, by inserting a respective portion 35 corresponding to this ingredient; for example, this portion could be inserted at the beginning of the time bar 34 (as schematically shown in the above-mentioned FIG. 5a and in FIG. 5b, which shows the updating of the display of the GUI 22 following the operation performed by the user), at the end of the time bar 34, or at an intermediate position, for example between pre-existing portions 35.

Figure 6A:
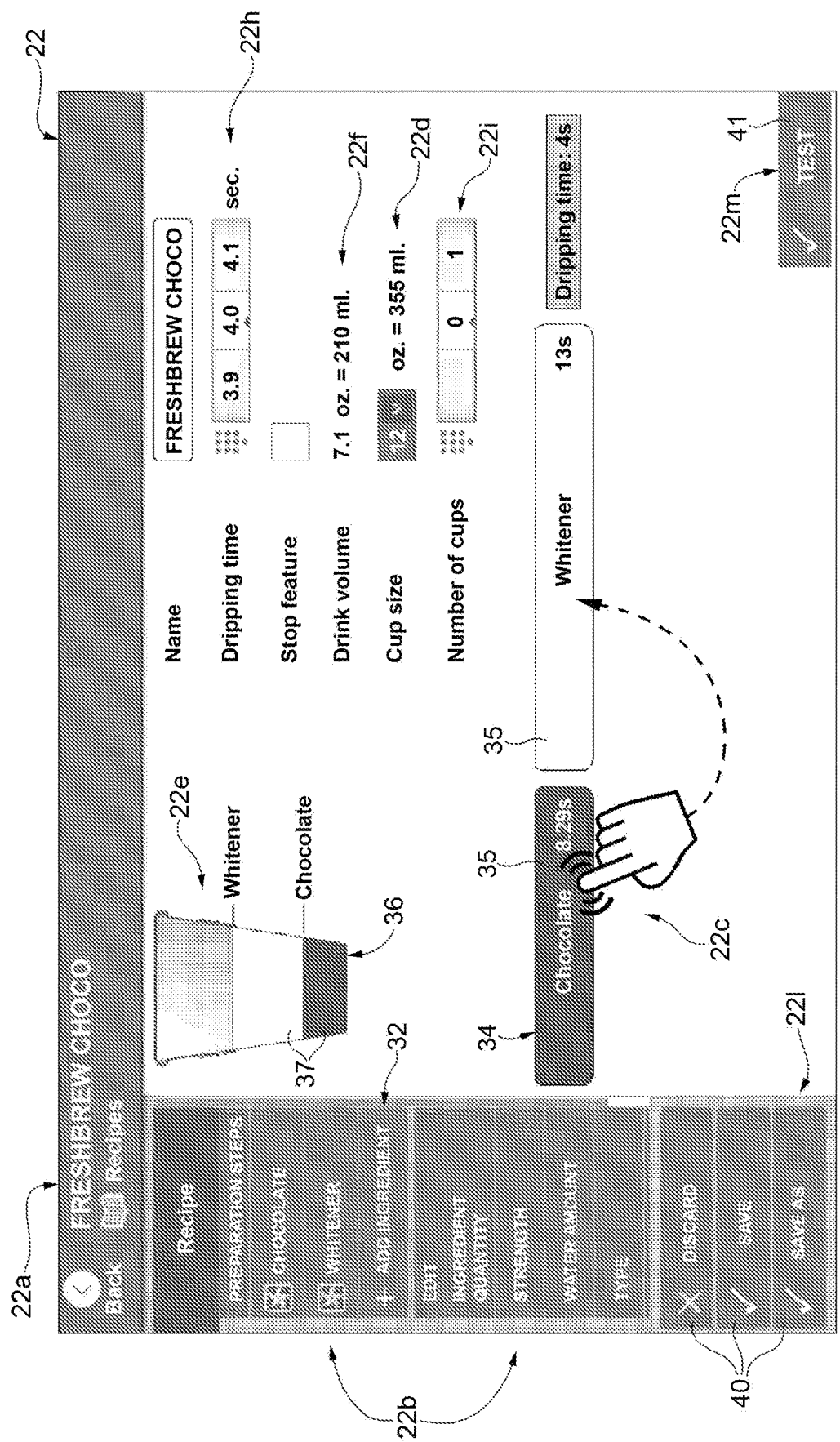
FIGS. 6*a*-6*b* show the graphical user interface with reference to a second user operation.

The display control unit 12 is also capable of detecting a selection operation on a portion 35 of the time bar (corresponding to a respective ingredient), and the drag and drop operation of this portion onto a different position on the time bar 34 displayed in the third interface area 22c of the GUI 22, as schematically shown in FIG. 6a.

In particular, this operation enables modifying the temporal order of the preparation steps in the consecutive sequence represented by the time bar 34.

Figure 6B:
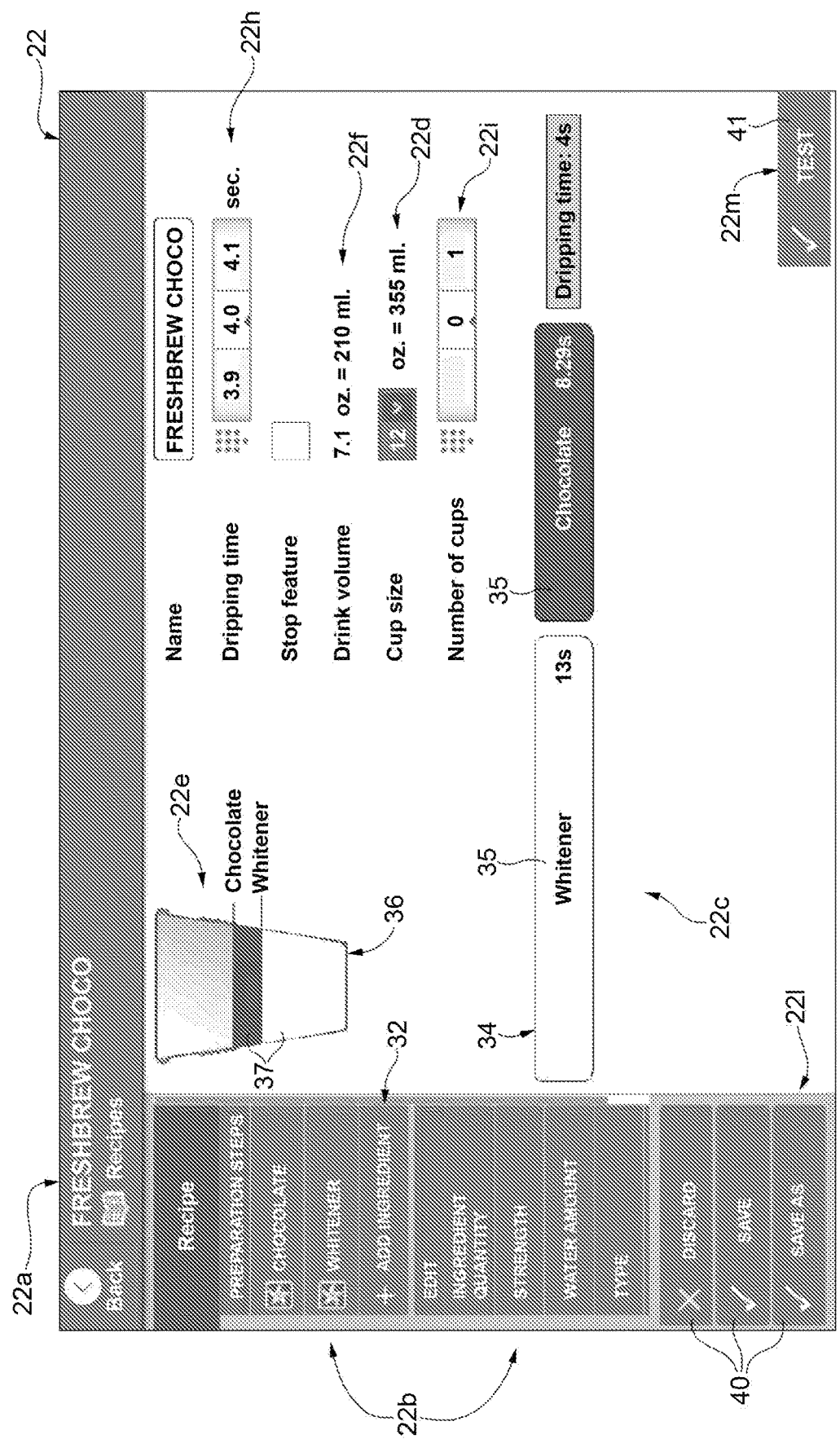

For example, as schematically shown in FIG. 6a and in FIG. 6b, which shows the updating of the display of the GUI 22 following the operation performed by the user, the user can invert the temporal order of the preparation steps represented by the portions 35 of the time bar 34.

Figure 7A:
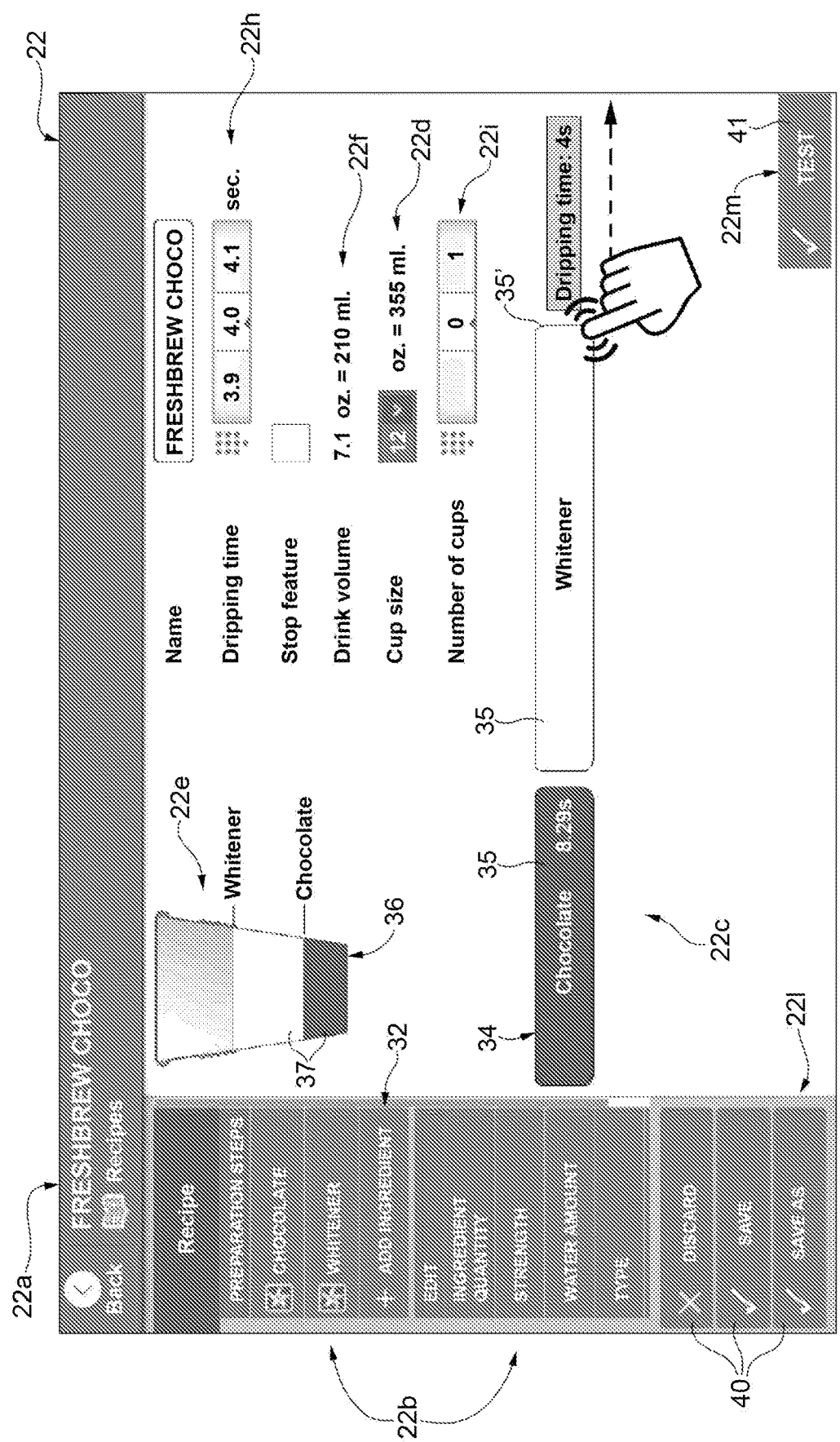
FIGS. 7*a*-7*b* show the graphical user interface with reference to a third user operation.

Furthermore, as schematically shown in FIG. 7a, the display control unit 12 is capable of detecting a selection operation on a terminal end 35' of a portion 35 of the time bar 34, and the dragging of this terminal end 35' in the time-increasing direction of the time bar 34; similarly, the display control unit 12 is capable of detecting a widening/shrinking operation (known as "pinch out" or "pinch in") performed by the user within a given portion 35 of the time bar 34.

In particular, this operation enables modifying the duration of the preparation steps in the consecutive sequence represented by the time bar 34.

Figure 7B:
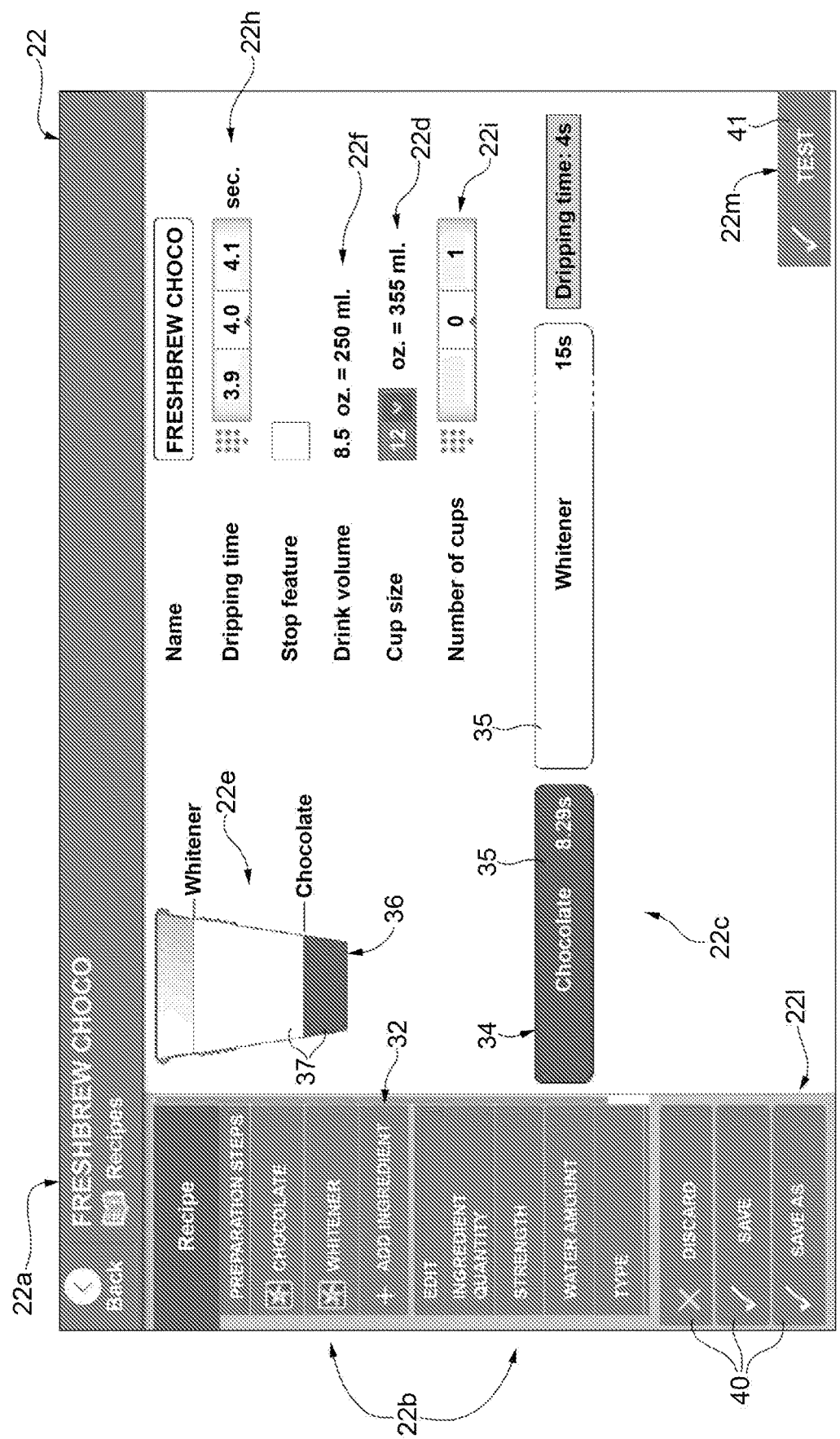

For example, as schematically shown in FIG. 7b, which shows the updating of the displayed GUI 22 following the operation performed by the user, the user can modify the duration of the second preparation step, by enlarging/shrinking the associated portion 35 of the time bar 34 (in this case, the duration passes from 13s to 15s).

In particular, by means of suitable algorithms, the display control unit 12 is configured to determine the resulting duration of the portion 35 selected by the user, based on the entity of the pinch in/out operation performed by the user.

In a manner not shown, but which will be obvious to an expert in the field, the display control unit 12 is also capable of detecting an operation of selection of a portion 35 of the time bar 34, and of dragging of the selected portion 35 towards a lower or upper end of the touch screen 15, or, alternatively, to a deletion area (represented by the so-called "trash can") displayed specifically on the touch screen 15.

In particular, this operation enables removing an ingredient, and the related preparation step, from the time bar 34.

In any case, the display control unit 12 consequently updates the schematic representation 36 of the receptacle 25, in the fifth interface area 22e of the GUI 22, as a function of each editing operation on the time bar 34, so as to ensure consistency between the display areas (also updating the calculation of the volumes occupied in the receptacle).

In a similar manner, the selection and editing operations previously described with reference to the time bar 34 can be implemented by the user on the schematic representation 36 of the receptacle 25, in order to create/modify the recipe for preparing the beverage.

In particular, the user can select and drag the ingredients inside this schematic representation 36; change the arrangement of the filling areas 37 inside the schematic representation 36; or delete one or more of the filling areas 37.

In this case, the display control unit 12 consequently updates the time bar 34 as a function of each editing operation on the schematic representation 36 of the receptacle 25 in the fifth interface area 22e of the GUI 22, again so as to ensure consistency each time between the display areas.

According to a further aspect of the present invention, the display control unit 12 is also programmed to implement, following any change made by the user to the recipe, a check to verify if the resulting total volume inside the selected receptacle 25 exceeds the maximum volume allowed by the same receptacle 25.

In the case where this maximum volume is exceeded, for example due to the addition of a further ingredient to the recipe, or an increase in the duration of a preparation step or in the quantity of an already selected ingredient, the display control unit 12 controls the display of one or more alarms on the GUI 22 of the touch screen 15.

Figure 8:
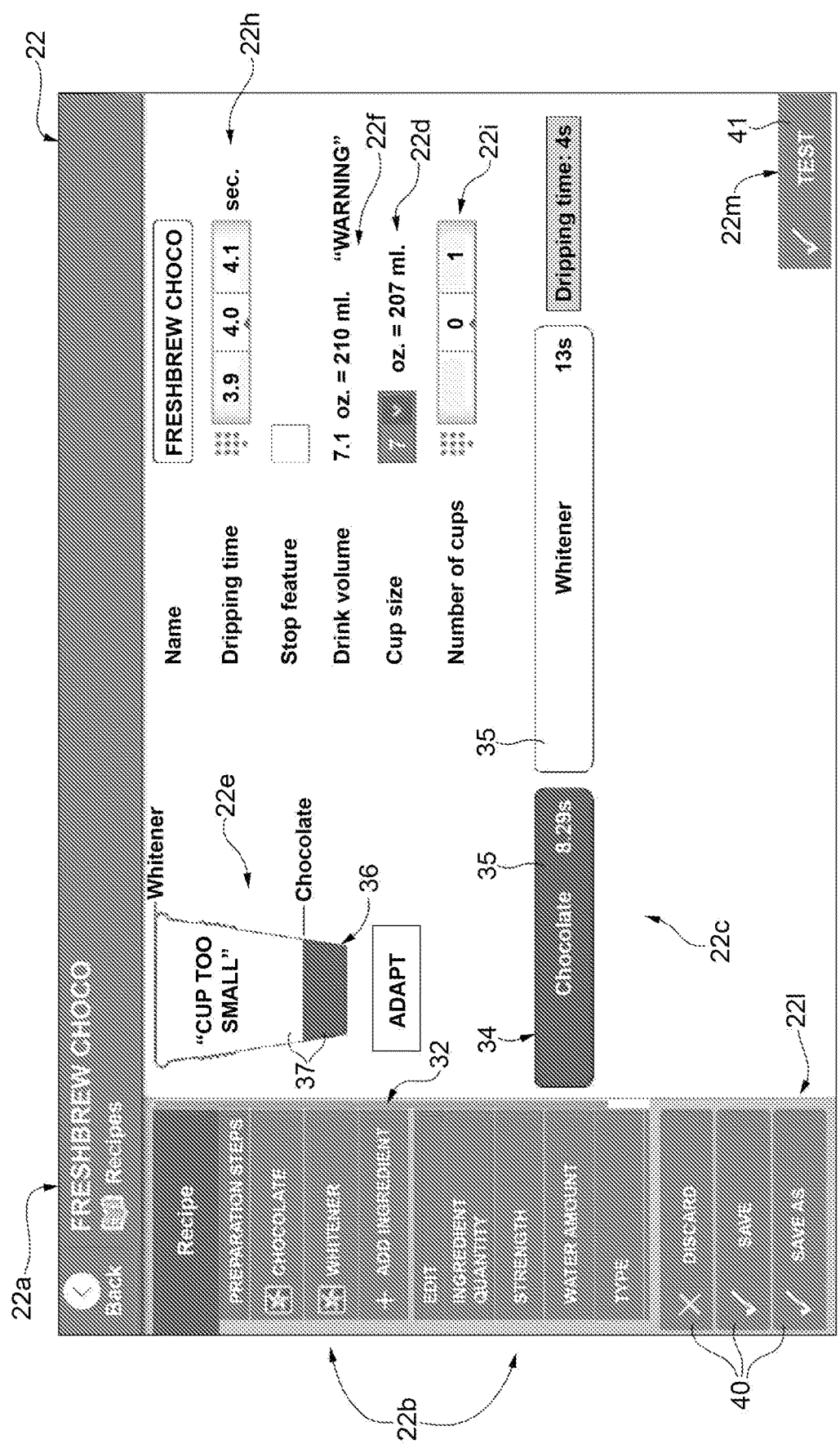
FIG. 8 shows the graphical user interface in an alarm operating mode.

For example, as schematically shown in FIG. 8, an alarm message, in this case "cup too small", could be overlaid on the schematic representation 36 of the receptacle 25 in the fifth interface area 22e of the GUI 22; this schematic representation 36 also visually shows that the maximum volume has been exceeded, as the upper filling area 37, in this case the second filling area 37, exceeds the height of the upper rim of the schematic representation 36 of the receptacle 25.

Alternatively, or in addition, the display control unit 12 can display, as shown in FIG. 8, a further alarm message, in this case "warning", in the sixth interface area 22f of the GUI 22, next to the indication of the calculated filling volume of the receptacle 25; this indication can also be shown with characters of a different colour, as it exceeds the capacity of the receptacle 25 selected for the preparation of the recipe.

As a consequence of the alarm indication, the display control unit 12 also controls the display (for example, directly beneath the above-mentioned schematic representation 36 of the receptacle 25 in the fifth interface area 22e of the GUI 22, as shown in FIG. 8) of an adaptation command, which the user can touch select to activate an automatic operation for adapting all of the recipe's ingredients to the size of the receptacle 25 that has been chosen and the volume of which has been exceeded.

Following this operation, by means of a suitable algorithm, the display control unit 12 determines a proportional reduction of the volume of the already selected ingredients, in order to adapt them to the volume of the receptacle 25; for example, the above-mentioned algorithm calculates the maximum quantity for each ingredient (through proportional reduction of the associated quantity) that does not result in exceeding the maximum volume provided by the selected receptacle.

Alternatively, or in addition to the option of automatic adaptation of the quantity of the selected ingredients, the display control unit 12 allows the user the possibility of selecting a different capacity for the receptacle 25 and/or reducing one or more of the quantities of the selected ingredients, by means of the previously described selection tools; for example, by reducing the duration of the related preparation step (reducing the width L of the associated portion 35 of the time bar 34) and/or reducing the height h of the associated filling area 37 in the schematic representation 36 of the receptacle 25.

In any case, the display control unit 12 controls the display, in a ninth interface area 22l of the GUI 22, of suitable save commands 40 that, when touch selected by the user, allow saving the edited recipe at any time, overwriting the starting recipe or creating a new one, or cancelling all the changes made up to that moment.

Furthermore, the display control unit 12 controls the display, in a tenth interface area 22m of the GUI 22, of an execution command 41, which, when touch selected by the user, allows performing a test on the recipe by means of a test beverage supply.

From examination of the characteristics of the present invention, it can be appreciated how it enables achieving the intended goals and offers many advantages with respect to the known art.

In particular, the described solution enables improving the user's experience in using the automatic beverage dispensing machine 1, allowing the user to easily and quickly create new recipes for the preparation of beverages or to modify existing recipes.

Interaction of the user with the automatic beverage dispensing machine 1, via the associated HMI module 4, of an improved type, is thus simplified, quicker and aimed at the effective needs of the user.

Finally, it is clear that modifications and variants can be made to that set forth herein without departing from the scope of the present invention, as defined in the appended claims.

For example, according to a further aspect of the present invention, the display control unit 12 may be configured to automatically apply filters on the selections the user is allowed to make, depending on structural and/or contingent characteristics (i.e. linked to particular operating conditions) of the automatic beverage dispensing machine 1.

For example, the display control unit 12 is programmed to limit the choice of receptacles 25 selectable by the user, based on checking the types of receptacles 25 effectively present in the machine; similarly, it can limit the choice of recipes and/or ingredients selectable for these recipes, based on the types of ingredients effectively present in the machine, or the functional characteristics of the automatic beverage dispensing machine 1 (for example, in the case where a fruit pressing tool is not present, the possibility of selecting fruit squash recipes is removed).

This intelligent and automatic filtering carried out by the HMI module 4 enables advantageously limiting the information load and choices for the user, on the basis of the effective possibilities offered by the configuration of the automatic beverage dispensing machine 1 and, at the same time, reducing the possibility of the user making errors.

Figure 9:
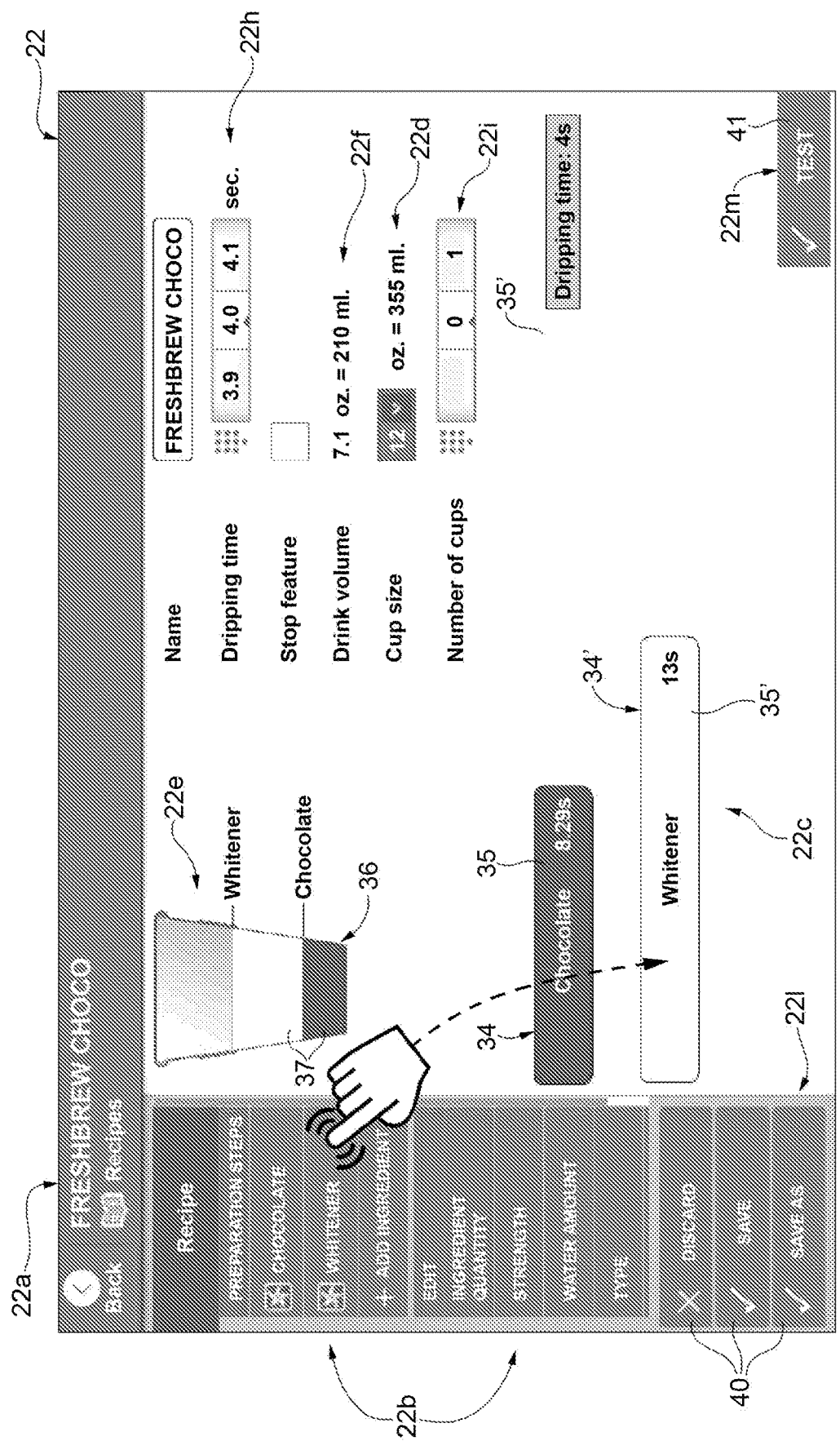
FIG. 9 shows the graphical user interface in a further embodiment.

Furthermore, according to a further aspect of the present invention, and as schematically shown in FIG. 9, the display control unit 12 can be programmed to control the display of a further time bar 34' in the third interface area 22c, for example beneath time bar 34.

Similarly to what has already been described, the further time bar 34' is designed to comprise a plurality of respective consecutive portions 35', each corresponding to a respective ingredient that can be used in the preparation of the recipe, simultaneously with one or more of the ingredients defined in time bar 34.

In this embodiment, the actuator module 6 is operable to cause the simultaneous, i.e. in a same time interval, dispensing of two (or more) ingredients into the receptacle 25.

The display control unit 12 is therefore programmed to detect a further selection operation of an ingredient from the list of ingredients displayed in the second interface area 22b, and a drag and drop operation of this ingredient onto the time bar 34' displayed by the GUI 22. In particular, this operation allows inserting a further preparation step in the consecutive sequence represented by time bar 34'.

Furthermore, the display control unit 12 can be configured to offer further possibilities of user interaction, in particular further possibilities to cause recipe creation/modification, for example to alter an amount of sugar dispensed.

Furthermore, in a known manner, not described here in detail, the automatic beverage dispensing machine 1 can be provided with any known type of payment interface, designed for simultaneous or non-simultaneous payment when supplying the product, for example via contract, prepaid cards, subsequent charging, fidelity programs, or others.

Furthermore, the HMI module 4 can be provided with further features (of a known type), such as a pairing unit for example, to interface with a user's mobile electronic device, such as a smartphone, a feature phone, a tablet, a phablet, a portable computer or similar, for exchanging data (after authorization from the user), such as the user's preferences, data regarding friends, relations or acquaintances, taken, for example, from the address or phone book, etc.; to this end, the HMI module 4 may comprise Bluetooth™, WiFi™, radio frequency or any other type of wireless communications capability, or a port for wired coupling, for example, of the USB or Firewire™ type or similar.

The HMI module 4 can also be provided with an identification unit, designed to enable identification of the user of the automatic beverage dispensing machine 1 and comprising, for this purpose, any tool suitable for implementing a contact or contactless identification, such as a fingerprint reader, an iris recognizer, or a code, magnetic card or digital chip reader, or a reader of similar storage media containing user identification information.

Finally, the HMI module 4 may possibly be remotely connected to the controller 2 of the automatic beverage dispensing machine 1 (for example, by being implemented in a mobile device carried by the user and communicatively paired to the controller 2). Furthermore, the HMI 4 may be of a different type from that described, for example including, alternatively or in addition to the touch screen 12, suitable physical selection/activation buttons, one or more sliders or a joystick, mouse, touchpad, or similar.

The invention claimed is:

1. An automatic beverage dispensing machine, comprising:
    an electronic controller;
    a human-machine interface operatively coupled to the controller, the human-machine interface configured to acquire a selection made by a user of a recipe for preparation of a beverage; and
    an actuator module operatively coupled to the controller to cause dispensing into a receptacle of a beverage prepared according to the recipe selected via the human-machine interface;
    wherein the human-machine interface comprises:
        an electronic touch-sensitive display unit; and
        an electronic control unit coupled to the electronic touch-sensitive display unit to cause the electronic touch-sensitive display unit to display a graphical user interface including an area, where a recipe time bar including a number of portions is displayed;
    wherein each of the number of portions is associated with a respective ingredient and a respective preparation step of the recipe and has a width indicative of the duration of the associated preparation step and/or of the quantity of the associated ingredient;
    wherein the human-machine interface is further configured to allow the user to create or modify a recipe via insertion of a number of ingredients on the recipe time bar, each of the number of ingredients in a respective portion, a position of each of the number of ingredients on the recipe time bar determines a temporal positioning of the respective preparation step within consecutive preparation steps of the recipe;
    wherein, in order to allow an ingredient to be inserted on the recipe time bar, the electronic control unit is configured to:
        cause the display, in a further area of the graphical user interface, of a list of ingredients that can be used in the definition of the recipe;
        detect a touch-selection operation by the user of an ingredient in the list of ingredients and a drag and drop operation of the selected ingredient onto the recipe time bar;
        detect the drop position of the ingredient on the recipe time bar; and
        update the display of the recipe time bar by generating a new portion corresponding to the selected ingredient at the drop position.

2. The automatic beverage dispensing machine according to claim 1, wherein the electronic control unit is configured to detect a touch-selection operation by the user of a portion of the recipe time bar, and of a drag and drop operation onto a different position of the recipe time bar, to cause a change in the temporal order of the associated preparation steps in the consecutive sequence of preparation steps of the recipe.

3. The automatic beverage dispensing machine according to claim 1, wherein the electronic control unit is further configured to detect a touch operation by the user of enlargement/shrinkage of the width of a portion of the recipe time bar, to cause a change in the duration of the associated preparation step.

4. The automatic beverage dispensing machine according to claim 1, wherein the electronic control unit is further configured to cause the display, in the area of the graphical user interface, of a further time bar including a number of respective portions each of which is associated with a respective ingredient and a respective preparation step of the recipe, which can be carried out simultaneously with one or more preparation steps associated with the portions of the recipe time bar.

5. The automatic beverage dispensing machine according to claim 1, wherein:
the human-machine interface is further configured to acquire the selection made by a user of the capacity of the receptacle for the beverage; and
the electronic control unit is further configured to cause the display of an alarm message in the case where a filling volume of the receptacle, calculated as a function of the ingredients and of the associated preparation steps in the recipe time bar, exceeds the selected capacity.

6. The automatic beverage dispensing machine according to claim 5, wherein the human-machine interface, in the case of exceeding the selected capacity, is configured to acquire the selection by a user of a command for the automatic adaptation to the selected capacity of the ingredients and of the preparation steps in the recipe time bar, to proportionally resize a duration and/or ingredient quantity associated with the preparation steps; and wherein the electronic control unit is further configured to cause the consequent modification of the display of the portions of the recipe time bar.

7. The automatic beverage dispensing machine according to claim 1, wherein the human-machine interface is further configured to acquire the selection made by a user of the capacity of the receptacle for the beverage; and wherein the electronic control unit is further configured to cause the display, in a further area of the graphical user interface, of a schematic representation of the receptacle, the displayed size of which is representative of the capacity selected by the user; and wherein the electronic control unit is further configured to divide a volume inside the schematic representation into a number of filling areas, equal to the number of selected ingredients, the size of each filling area being indicative of the quantity of a respective ingredient and/or proportional to the duration of the preparation step associated therewith, and the arrangement of the filling areas being based on the temporal arrangement of the associated preparation steps.

8. The automatic beverage dispensing machine according to claim 7, wherein the human-machine interface is further configured to allow the user to modify the recipe time bar through one or more of the following:
inserting one or more portions, each associated with a respective ingredient and with a respective preparation step of the recipe; enlarging/shrinking one or more portions (35); or
moving the position of one or more portions on the recipe time bar; and
wherein the electronic control unit is further configured to update the display of the schematic representation of the receptacle as a result of the modification to the recipe time bar.

9. The automatic beverage dispensing machine according to claim 1, wherein the electronic control unit is further configured to cause the display, in respective areas of the graphical user interface, of a list of recipes and ingredients for the creation or modification of recipes; and wherein the electronic control unit is further configured to filter the list, and consequently limit the display of the recipes and ingredients that can be selected by a user, based on operating characteristics of the automatic dispensing machine.

10. A computer program loadable in the electronic control unit of the automatic beverage dispensing machine according to claim 1, and designed to cause, when executed, the electronic control unit to become configured as claimed in claim 1.

* * * * *